United States Patent [19]

Schweizer et al.

[11] 4,236,532
[45] Dec. 2, 1980

[54] SMOKING ROD WRAPPER

[75] Inventors: Alfred D. Schweizer; William G. Erskine, both of Geneva; Daniel Turpin, Nyon, all of Switzerland

[73] Assignee: Gallaher Limited, Belfast, Northern Ireland

[21] Appl. No.: 940,996

[22] Filed: Sep. 11, 1978

[30] Foreign Application Priority Data

Sep. 16, 1977 [GB] United Kingdom ............ 38710/77

[51] Int. Cl.³ .................. A24B 15/42; A24C 5/60; A24D 1/02
[52] U.S. Cl. .................................... 131/9; 131/15 R; 131/24
[58] Field of Search ............... 131/15 R, 15 A, 15 B, 131/15 C, 17 R, 17 A, 24, 2, 140 C, 140 R, 144, 140 B, 8 R, 8 A, 9, 10 R; 101/129, 114; 427/282, 288

[56] References Cited

U.S. PATENT DOCUMENTS

| 2,801,636 | 8/1957 | Pfoh | 131/15 C |
|---|---|---|---|
| 2,976,190 | 3/1961 | Meyer | 131/15 R |
| 3,006,347 | 10/1961 | Keaton | 131/15 R |
| 3,285,253 | 11/1966 | Lebert | 131/15 R |
| 3,422,819 | 1/1969 | Jones et al. | 131/15 R |
| 4,044,778 | 8/1977 | Cohn | 131/15 R |
| 4,060,091 | 11/1977 | Watson et al. | 131/9 |
| 4,104,431 | 8/1978 | Luke | 427/288 |
| 4,140,135 | 2/1979 | Godfrey, Jr. | 131/15 C |

*Primary Examiner*—V. Millin
*Attorney, Agent, or Firm*—Murray and Whisenhunt

[57] ABSTRACT

A wrapper for a smoking rod has screen printed on its surface a series of dots containing a volatile additive which is transferred into the main stream smoke when the smoking rod is smoked.

22 Claims, 7 Drawing Figures

SMOKING ROD WRAPPER

The present invention relates to wrappers for smoking rods, such as cigarettes, cigars and cigarillos, comprising a combustible tubular wrapper, usually made of paper or a tobacco based material, surrounding a combustible filler of tobacco and/or tobacco substitute.

It is accepted that the smoke produced by the combustion of tobacco products contains a number of irritating substances. Many proposals have been made for reducing the amount of such substances inhaled by the smoker. These proposals fall into three groups. In the first group are those which aim to reduce the amount of irritant material which is produced during the combustion process itself, for example by the use of different types of tobacco or tobacco blends, by special processing or extraction, by the partial or total replacement of tobacco with so-called tobacco substitutes, or by variation of the combustion temperature. The second group relates to the dilution of the smoke before it reaches the smoker's mouth, for example by the use of a highly permeable paper or by the perforation of the paper or filter. The third group relates to the construction of the filter itself, to achieve high filtration efficiency or the selective removal of particular smoke components. Whilst these proposals can lead to a significant reduction in the inhalation of undesirable smoke components, this reduction is accompanied by a parallel decrease in the satisfaction afforded to the smoker. This is because it is difficult to reduce the tar yield of the product or the irritancy of the smoke without at the same time reducing the amount of desirable components made available to the smoker or impairing the flavour of the product.

The present invention is concerned with the application of additives, such as smoke producing agents, smoke nucleation agents, flavouring agents, and physiologically active agents such as nicotine components to the smoking rod, in order to improve or help to improve the satisfaction provided to the smoker. This is particularly useful for low tar products incorporating tobacco or tobacco substitute.

It has previously been proposed to apply such additive to the filler material and it is well know that certain materials are already added in practice to the filler. However, it is almost impossible to obtain a concentration profile of the additives over the smoking length in order to control the puff-by-puff transfer to the smoker, and indeed local concentrations of an additive such as nicotine could be undesirable. It has been proposed (British Patent Specification No. 1,342,931) to inject additives through the wrapper into the filler material but this is not entirely satisfactory because of paper perforation and because of the discontinuous distribution of the additive. It has also been proposed (British Patent Specification No. 1,111,007) to impregnate the wrapper with a nicotine component but this is unsatisfactory as controlled distribution of the nicotine is uncertain and the combustion characteristics of the wrapper are changed. It has been proposed (British Patent Specification No. 1,351,560) to gravure print a burn accelerating agent in a series of small squares to control the speed at which the wrapper burns but this does not contribute to the solution of the problem of the transfer of additives to the main stream smoke to enhance the smokers' satisfaction. It has also been proposed (Austrian Patent Specification No. 277,028) to apply to a wrapper a coating in the form of a liquid dispersion of micro-capsules of flavouring or aromatic material but this involves a coating of the whole surface of the wrapper which will effect undesirably its flexibility, ventilation and combustion properties. The addition to a filter of the smoking rod of components which are to be transferred to the smoke is already current practice, but this is limited to quite volatile materials, for example a flavour such as menthol.

In accordance with the present invention, a method of producing a wrapper for a smoking rod comprises screen printing onto the surface of the wrapper a series of discrete dots of an ink containing an additive which will in use, upon approach of the hot burning tip of the smoking rod, be transferred and contribute to the main stream smoke drawn through the rod to enhance the satisfaction to the smoker.

We have found that appreciable advantages arise from this method. Thus the amount and location of additive deposited on the surface of the wrapper can be precisely controlled and thereby transferred into the main stream smoke in a controlled manner. The paper or other wrapper retains its flexibility and combustibility more or less unchanged. Furthermore, and by comparison with gravure printing, the screen printing of the dots enables dots of greater height and more accurate definition to be deposited so that an acceptably high and accurate loading of the additive can be applied, in practice up to 5 mg/sq.cm., whilst leaving an acceptably high proportion of the surface area of the wrapper free of dots.

The wrapper may be printed with the additive-containing ink on the surface which will become either the inner and/or outer surface of the wrapper in use but preferably it is printed on the inner surface of the wrapper where it is least likely to be disturbed upon handling of the smoking rod.

The additive will be one or more of a smoke producing agent, a smoke nucleation agent, a flavouring agent, and a physiologically active agent.

The additives will generally be compounds which transfer into the main stream smoke without undergoing appreciable thermal degradation, which give the required satisfaction to the smoker, and which are known to present no significant health hazards. They may also be, or include, compounds which undergo thermal degradation during the transfer process, which the products of such degradation are known, present no health hazards, and provide the required satisfaction to the smoker.

Suitable smoke producing agents include esters such as methyl palmitate, methyl stearate, vinyl stearate, dimethyl sebacate, dimethyl dodecandioate, dimethyl tetradecandioate, glyceryl trimyristate, pentaerythrityl tetraacetate, monoethyl sebacate, trimethyl citrate, myristyl myristate, palmityl palmitate, glyceryl monostearate, glyceryl trilaurate, vinyl oleate, and diethyl hexyl sebacate. Other suitable smoke producing agents include docosene, myristic acid (tetradecanoic acid), lanbritol wax (a blend of cetyl alcohol and stearyl alcohol with a cetyl/oleyl alcohol ether of polyethylene glycol), beeswax (mainly consisting of myricyl palmitate and cerotic acid), and ceresine wax. Of these glyceryl trimyristate is preferred.

A suitable smoke nucleation agent is ammonium chloride.

The invention is particularly useful for the application to a smoking rod of a physiologically active nicotine compound. Such a compound may include a stable salt of nicotine such as nicotine ascorbate, nicotine citrate, nicotine lactate, nicotine succinate, nicotine phosphate, nicotine tartrate, and nicotine hydrogen tartrate. Di-nicotine tartrate might possibly be used but this is less suitable as it tends to be unstable. The preferred nicotine compound is nicotine tartrate or nicotine hydrogen tartrate.

Two or more additives, if mutually compatible, may be incorporated in the same ink for deposition simultaneously. However, there is a practical limit to the amount of additive which can be deposited in this way, bearing in mind the maximum volume of each printed dot and the maximum quantity of additive which can be carried in the ink, taking account of the other ink components necessary to provide the ink with the necessary rheological properties. If two additives to be deposited are mutually incompatible, or if a loading of the wrapper with the additives is required in excess of that which could be deposited in a single series of dots, different additives may be incorporated in different inks and printed in separate series of dots. If the inks are mutually incompatible, care must be taken to ensure that the dots of the different series do not overlap one another.

We have found most surprisingly that the presence of certain components in the printed deposit on the wrapper may significantly enhance the transfer of an additive in the deposit into the main stream smoke. In this context the transfer of the additive relates to the amount of the additive which is carried by the main stream smoke through the smoking rod to the mouth end and is therefore available to the smoker. The mechanics of additive transfer are not wholly understood and are subject to many variables such as the filtering effect of the smoking rod filler, the extent to which the volatile additive condenses on the filler as it approaches the cooler mouth end of the smoking rod, the extent to which the additive vaporises or sublimes into the main stream smoke when a puff is taken as distinct from being lost in the side stream smoke between puffs, and the temperature of the burning tip of the smoking rod. However, an important factor is believed to be the particle size of the aerosol formed by the vaporising or subliming additive, the smaller the particle size, the greater the transfer. It is therefore believed that the close proximity of certain components reduces the particle size of the additive aerosol and hence promotes the transfer of the additive in the main stream smoke. The experiments have shown that it is not sufficient for the component merely to be present in the filler but to be present on the wrapper and thereby active upon the initial additive aerosol formation. It is believed that the effect depends on mutual interaction of the component and the additive, to form either a greater proportion of aerosol or a more stable aerosol. Examples which work with nicotine compounds are components such as docosene, stearic acid, oleic acid, which have an affinity for free base nicotine. In the present context such component will be deposited alongside the additive by being incorporated with the additive in the same series of printed dots, or deposited in a separate series of dots which may overlie those of the first series.

The component which promotes the transfer of the additive is not necessarily a different additive which contributes to the smoker's satisfacton. However, it is clearly better if the component is another additive which contributes to the smoker's satisfaction and a smoke nucleation or smoke producing agent has been found to be effective in this way in enhancing the transfer to the main stream smoke of an additive such as nicotine. When the active component is another of the additives, it would be desirable if both additives mutually promote the transfer of one another into the main stream smoke.

In a typical experiment a wrapper was screen printed with a series of dots of an ink containing nicotine hydrogen tartrate to provide a loading of about 3.5 mg of nicotine hydrogen tartrate per cigarette, and with a separate series of dots containing a similar loading of 1-docosene. A total cumulative transfer of about 24% of nicotine was obtained when a cigarette having a tobacco substitute filler and incorporating the wrapper was smoked, compared with 15% for a control cigarette of which the wrapper was not printed with the 1-docosene. A similar experiment in which the nicotine hydrogen tartrate and 1-docosene were incorporated in a common series of dots led to a slightly lower cumulative nicotine transfer but still some 50% higher than with the control cigarette.

The inks used in the present invention differ from conventional printing inks mainly in the fact that the coloured component (pigment or dye) is replaced by one or more of the above mentioned additives, and that the other components of the ink are selected to be acceptable for a smoking product.

The ink will include a vehicle preferably in the form of a volatile hydrophilic liquid, for example water or an organic solvent which dries off by evaporation. Examples of the latter are ethyl alcohol, isopropyl alcohol or mixtures of these.

The ink is also given a suitable thickness and viscosity by the addition of a thickening agent, particularly a cellulosic polymer such as carboxymethyl cellulose, polymethyl hydroxy cellulose, polyethyl hydroxy cellulose or hydroxy propyl cellulose.

The ink may also contain hydrophobic resins which will function as barriers to the diffusion of the additives from the dots during storage.

Finally, in order to give the ink a certain "body" and to improve printing characteristics, a charge in the form of a filler, such as calcium carbonate, titanium dioxide, silicon dioxide, or a silicate such as Bentonite may be incorporated. Non-dissolved additives may also constitute a charge.

If the additive is applied in a uniform distribution along the wrapper and hence along the smoking rod, the uniform distribution of the additives does not lead to uniform transfer of the additive into the main stream smoke drawn through the rod. This is because the additive vaporises or sublimes into the main stream smoke adjacent to the hot burning tip of the rod but is partially recondensed and filtered as it passes along the cooler portion of the rod towards the mouth end. Upon subsequent approach of the burning tip, the additive is again transferred into the main stream smoke together with the original additive at that part of the rod. It follows that the relative transfer of the additive into the main stream smoke progressively increases as the rod is smoked. In order to compensate for this effect, the additive is preferably reduced towards the mouth end. This helps to compensate for the uneven transfer of the additives into the main stream smoke. By an appropriate choice of the concentrated gradient of additive along the rod, it is possible to approach a substantially level transfer of the additive into the main stream smoke puff-by-puff. The concentration gradient of the additive along the wrapper can be precisely controlled when the additive is applied by the present method and can be varied within appreciable limits by changing ink concentration, dot size or height, or by changing the density of printing, or by selecting the area of the wrapper over which the dots are printed.

BRIEF DESCRIPTION OF THE DRAWINGS

The present invention is illustrated by the attached drawings, wherein.

The following examples illustrate the present invention.

EXAMPLE 1

A composition with suitable rheological properties for batch screen printing tests was made up by adding 0.66 g. of silicon dioxide (Aerosil 200 obtained from Degussa AG, Zurich) and 2.56 g. of low viscosity carboxy methyl cellulose (Hercules CMC 7L F), 30 ml. of 1.0 M solution of nicotine hydrogen tartrate. Using a nickel screen, with a mesh size of 50, this mixture was applied to one surface of a conventional cigarette paper, of width 27.5 mm. and length 66 mm. The printing occupied an area of about 24×51 mm., and took the form of distinct, well separated dots of diameter about 250 microns and height about 50 microns.

About 7 mg. of nicotine hydrogen tartrate were thus deposited onto the paper at a density of 0.7 mg/cm². The total cumulative transfer of nicotine, when this paper was used with a tobacco substitute filler, of the type disclosed in our British Patent Specification No. 1,431,045, amounted to 21% of the amount of nicotine present on the printed wrapper. Furthermore, the puff number of the cigarette was not changed by the addition of the printing to the paper.

Figure 1:
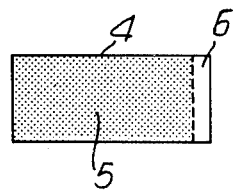
FIG. 1 is a view of a paper cigarette wrapper, showing one embodiment of arranging the additive dots.
Figure 1A:
FIG. 1A is a histogram showing additive transfer during the smoking of a cigarette made from the wrapper of FIG. 1.

FIG. 1 of the accompanying drawings shows the wrapper 4 with an area 5 which will surround the filler, and printed with the series of dots, and an end portion 6 which in use will surround a filter plug. FIG. 1A is a histogram showing the total nicotine transfer during the smoking of each of the first third, second third, and the third third, of the length of the cigarette. It will be seen that the transfer increases significantly from the beginning to the end of the smoking of the cigarette.

EXAMPLE 2

Figure 2:
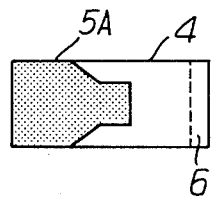
FIG. 2 is a view of a paper cigarette wrapper, showing one embodiment of arranging the additive dots.
Figure 2A:
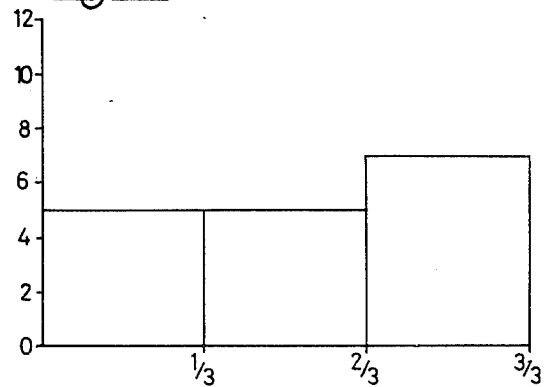
FIG. 2A is a histogram showing additive transfer during the smoking of a cigarette made from the wrapper of FIG. 2.

The ink of composition described in the preceding example was applied to the surface of a conventional cigarette paper in the pattern shown at 5A in FIG. 2 of the accompanying drawings. With the same filler material, the total cumulative transfer of nicotine was 18% and FIG. 2A is a histogram corresponding to FIG. 1A but in respect of the FIG. 2 example and showing how the transfer is considerably flattened although very slightly increased at the end.

EXAMPLE 3

Figure 3:
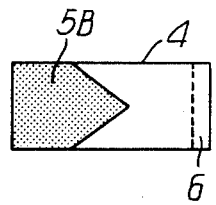
FIG. 3 is a view of a paper cigarette wrapper, showing one embodiment of arranging the additive dots.
Figure 3A:
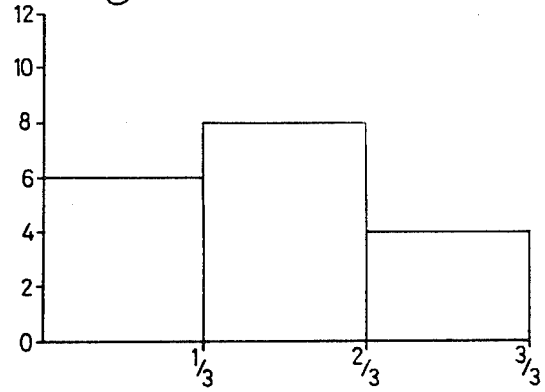
FIG. 3A is a histogram showing additive transfer during the smoking of a cigarette made from the wrapper of FIG. 3.

The experiment was repeated as in Example 2 but with the pattern printed as shown at 5B in FIG. 3 of the accompanying drawings. The total transfer of nicotine was again 18% and FIG. 3A is a histogram also corresponding to FIG. 1A but in respect of the FIG. 3 example. This shows again a slightly uneven transfer but one which is much more level than in the first example.

These examples make it clear that the puff-by-puff profile can be modified more or less at will by appropriate profiling of the printed area of the wrapper.

In the above examples the nicotine transfer was determined in conventional fashion by causing the nicotine to be deposited in a Cambridge filter attached to the mouth end of the cigarette during a smoking test. The results with respect to the three examples are summarised in the following table, in which FBN represents free base nicotine:

| Profile | Nicotine loading mg FBN/cig. | Cumulative transfer to Cambridge filter mg FBN/cig. | | | Non-cumulative % transfer to Cambridge filter | | |
|---|---|---|---|---|---|---|---|
| | | 1/3 | 2/3 | 3/3 | 1/3 | 2/3 | 3/3 |
| 1 | 2.6 | 0.08 | 0.24 | 0.54 | 3 | 6 | 12 |
| 2 | 1.6 | 0.07 | 0.14 | 0.25 | 5 | 5 | 7 |
| 3 | 1.9 | 0.11 | 0.26 | 0.33 | 6 | 8 | 4 |

EXAMPLE 4

A further composition with suitable rheological properties for batch screen printing tests was made up from 20 g. of 1-docosene, 60 ml. of water, 4 g. of carboxy methyl cellulose (Hercules CMC 7 LF), 0.5 g. Bentonite, 1.4 g. sorbitan monostearate (Span 60) and 1.4 g. polyoxyethylene sorbitan monostearate (Tween 60). The last two of these constituents are surfactants.

This mixture was screen overprinted on the wrapper already printed with an ink containing the nicotine hydrogen tartrate as described in Example 1, to give a loading of about 3 mg. of 1-docosene on the paper. The paper was used in a cigarette as described in Example 1 and test smoked. The results showed good smoke production representing good transfer of the 1-docosene into the main stream smoke, and an improvement of some 50% in the cumulative nicotine transfer.

Figure 4:
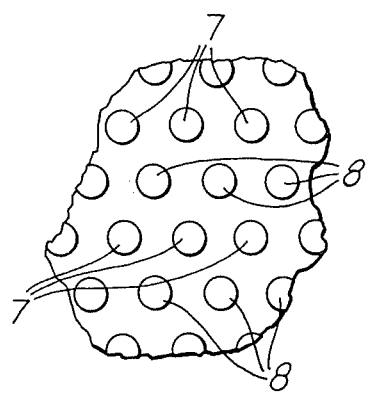
FIG. 4 is an enlarged view of a paper cigarette wrapper having two different additives printed thereon.

The appearance of the printed sample of the wrapper produced in accordance with Example 4 is shown in FIG. 4 of the accompanying drawings in which the dots containing the nicotine hydrogen tartrate are shown on a square matrix 7 and those containing the 1-docosene on a square matrix 8.

We claim:

1. A method of producing a wrapper for a smoking rod, the method comprising screen printing onto the surface of the wrapper, a series of discrete dots of an ink containing an additive which will in use, upon approach of the hot burning tip of the smoking rod, be transferred and contribute to the main stream smoke drawn through the rod to enhance the satisfaction to the smoker, wherein the additive is one or more of a smoke producing agent, a smoke nucleation agent, a flavouring agent and a physiologically active agent.

2. A method according to claim 1, wherein the additive comprises a stable nicotine salt.

3. A method according to claim 2, in which the stable nicotine salt is nicotine tartrate or nicotine hydrogen tartrate.

4. A method according to claim 1, in which the ink contains a component the presence of which promotes the transfer of the additive into the main stream smoke.

5. A method according to claim 4, wherein the component is a different one of the additives.

6. A method according to claim 4, in which the additive is a stable nicotine salt and the component has an affinity for free base nicotine.

7. A method according to claim 6, in which the component is docosene.

8. A method according to claim 1, wherein two different additives are incorporated in the same ink.

9. A method according to claim 1, wherein two additives are separately incorporated in different inks which are printed on the wrapper in two different series of dots.

10. A method according to claim 1, wherein the ink contains a hydrophilic vehicle.

11. A method according to claim 10, in which the hydrophilic vehicle is one, or a mixture, of water, ethyl alcohol, and isopropyl alcohol.

12. A method according to claim 1, in which the ink contains a filler.

13. A method according to claim 12, in which the filler is calcium carbonate, titanium dioxide, silicon dioxide or a silicate such as Bentonite.

14. A method according to claim 1, wherein the ink contains a thickening agent.

15. A method according to claim 14, in which the thickening agent is carboxymethyl cellulose, polymethyl hydroxy cellulose, polyethyl hydroxy cellulose, or hydroxy propyl cellulose.

16. A method according to claim 1, wherein the additive is concentrated at that end of the wrapper which is to be at the lit end of the smoking rod.

17. A method according to claim 16, wherein the additive concentration is determined by varying the dot size or dot height.

18. A method according to claim 16, wherein the additive concentration is determined by controlling the dot density.

19. A method according to claim 16, wherein the additive concentration is determined by controlling the area of the wrapper surface which is printed.

20. The product produced by the process of claim 1.

21. A method of producing a wrapper for a smoking rod, the method comprising screen printing onto the surface of the wrapper, a series of discrete dots of an ink containing a hydrophilic vehicle, a thickening agent, a filler, and a stable nicotine salt, the printing extending over a selected area of the wrapper to provide a greater deposition of the ink adjacent to that end of the wrapper which will be the lit end in use.

22. A smoking rod of the kind comprising a filler of smoking material surrounded by a combustible tubular wrapper, the improvement wherein the filler is upgraded by the provision on the inner surface of the wrapper of a screen printed deposition of a series of discrete dots of an ink containing at least one additive selected from the group consisting of a smoke producing agent, a smoke nucleation agent, a flavouring agent, and a physiologically active agent, which will in use, upon approach of the hot burning tip of the smoking rod, be transferred and contribute to the main stream smoke drawn through the rod to enhance the satisfaction to the smoker, wherein the dots are printed over a selected area of the wrapper to provide a greater concentration of the additive at that end of the rod to be the lit end of the rod.

* * * * *